J. J. DRURY.
SPOOL OF THREAD.
APPLICATION FILED APR. 2, 1909.

928,507.

Patented July 20, 1909.

UNITED STATES PATENT OFFICE.

JOHN J. DRURY, OF EAST HAMPTON, CONNECTICUT, ASSIGNOR TO SUMMIT THREAD COMPANY, OF PORTLAND, MAINE, A CORPORATION OF MAINE.

SPOOL OF THREAD.

No. 928,507.      Specification of Letters Patent.      Patented July 20, 1909.

Application filed April 2, 1909. Serial No. 487,510.

*To all whom it may concern:*

Be it known that I, JOHN J. DRURY, of East Hampton, in the county of Middlesex and State of Connecticut, have invented certain new and useful Improvements in Spools of Thread, of which the following is a specification.

This invention has for its object to enable the outer or free end of a length of thread, which has been wound helically on a spool, to be secured by tying it to the opposite or inner end of the same length of thread, thus avoiding the employment of a slit or notch formed in one of the flanges of the spool to receive the outer end of the thread. The usual slit or notch formed for the purpose stated is objectionable in spools which are used on sewing machines, because the thread in being withdrawn from the spool is liable to catch on one side of the slit. It is usually necessary to provide a cap formed to cover the slitted end of the spool to prevent the catching of the thread. My invention, hereinafter described, obviates this necessity.

The invention consists in the improvements which I will now proceed to describe and claim.

Figure 1:
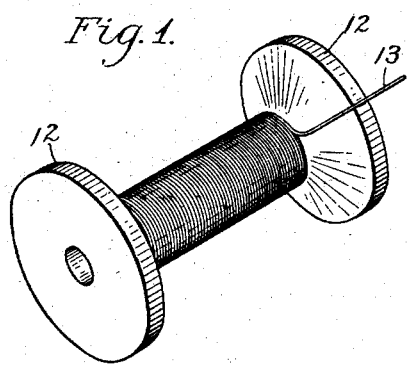
Figure 2:
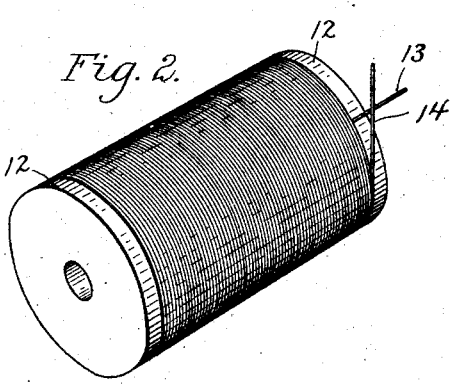
Figure 3:
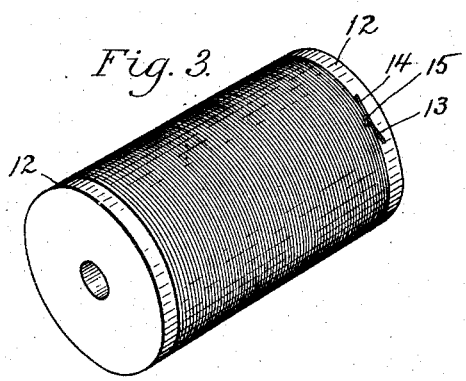

Of the accompanying drawings, forming a part of this specification,—Figure 1 represents a perspective view of a spool on which the thread has been partially wound. Fig. 2 represents a perspective view showing the outer end of the thread ready to be secured; and Fig. 3 represents a view similar to Fig. 2, showing the two ends of the thread tied together to secure the outer end, in accordance with my invention.

The same reference characters indicate the same parts in all the figures.

In the drawings,—12, 12 represent the usual heads or flanges of a spool adapted to hold a cylindrical body of thread wound thereon, the spool being of any suitable general form and construction. In carrying out my invention, I extend the inner end portion 13 of the length of thread outwardly from the body or barrel of the thread in such manner that as the winding progresses, the inner part of the extended portion will be confined between the inner side of one of the flanges and the body of thread wound on the spool. When the winding is completed, the relative positions of the inner end portion 13 and the outer end portion 14 of the length of thread, are substantially as indicated in Fig. 2, there being a sufficient quantity of the inner end portion projecting from the periphery of the spool to enable it to be tied to the outer end portion 14. The said outer end portion is then confined by the simple operation of tying it to the projecting part of the end portion 13, the knot 15 thus formed being indicated in Fig. 3.

It will be seen that the outer end of the thread is confined without forming a slit in one of the heads of the spool, and without the employment of a separate clip or fastening device. The end or flange of the spool adjacent to the outer end of the thread is therefore left smooth, so that the thread can be unwound from it without the aid of a cap or cover.

I claim:

A flanged spool and a length of thread helically wound into a cylindrical body thereon, the inner end of the thread extending outwardly from the inner layer of the body outside the periphery of the same, and the outer layer of the body being wound to cause the outer end of the thread to meet the outwardly extended inner end, the two ends being tied together.

In testimony whereof I have affixed my signature, in presence of two witnesses.

JOHN J. DRURY.

Witnesses:
    FRED H. BARTON,
    J. C. BARTON.